United States Patent
Batts

(10) Patent No.: US 9,267,677 B2
(45) Date of Patent: Feb. 23, 2016

(54) DEVICE FOR GENERATING LARGE VOLUMES OF SMOKE

(76) Inventor: Felix M. Batts, Rocky Mount, NC (US)

(*) Notice: Subject to any disclaimer, the term of this patent is extended or adjusted under 35 U.S.C. 154(b) by 1333 days.

(21) Appl. No.: 12/913,919

(22) Filed: Oct. 28, 2010

(65) Prior Publication Data

US 2011/0103778 A1    May 5, 2011

Related U.S. Application Data

(60) Provisional application No. 61/255,998, filed on Oct. 29, 2009.

(51) Int. Cl.
| | |
|---|---|
| F22B 27/16 | (2006.01) |
| F41H 9/06 | (2006.01) |
| F42B 12/48 | (2006.01) |
| A01M 13/00 | (2006.01) |
| A01M 29/12 | (2011.01) |
| A01G 13/06 | (2006.01) |

(52) U.S. Cl.
CPC *F22B 27/16* (2013.01); *F41H 9/06* (2013.01); *F42B 12/48* (2013.01); *A01G 13/065* (2013.01); *A01M 13/00* (2013.01); *A01M 29/12* (2013.01)

(58) Field of Classification Search
CPC ............ F22B 27/16; F24B 12/48; F41H 9/06; A01M 13/00; A01M 29/12; A01G 13/065
USPC ......... 126/401, 405–408; 239/136, 133, 14.1; 102/334, 329, 364, 370, 513; 43/127, 43/129
See application file for complete search history.

(56) References Cited

U.S. PATENT DOCUMENTS

| | | | | |
|---|---|---|---|---|
| 571,811 | A * | 11/1896 | Valentine | 422/125 |
| 887,743 | A * | 5/1908 | Storm, Jr. | 126/401 |
| 1,554,219 | A * | 9/1925 | Kitchen | 392/495 |
| 1,764,387 | A * | 6/1930 | Buchet | 239/133 |
| 2,402,402 | A * | 6/1946 | Hickman | 43/129 |
| 2,835,533 | A * | 5/1958 | Baker | A01M 7/0089 239/129 |
| 3,037,939 | A * | 6/1962 | Andrews | A01M 13/00 159/4.02 |
| 3,055,144 | A * | 9/1962 | Johnson | A01G 13/065 126/59.5 |
| 3,074,199 | A * | 1/1963 | Johnson et al. | 43/129 |
| 3,109,821 | A | 11/1963 | York et al. | |
| 3,175,733 | A * | 3/1965 | Lerner | 222/146.3 |
| 3,214,860 | A * | 11/1965 | Johnson | 43/129 |
| 3,229,409 | A * | 1/1966 | Johnson | 43/129 |
| 3,239,960 | A * | 3/1966 | Stevens | 43/129 |
| 3,242,098 | A * | 3/1966 | Andrews | 422/305 |
| 3,349,042 | A * | 10/1967 | Andrews | 516/2 |
| 3,441,360 | A * | 4/1969 | Johnson | 431/345 |
| 3,447,532 | A * | 6/1969 | Poppendiek | B01F 3/04007 126/263.01 |
| 3,448,924 | A * | 6/1969 | Congdon | 239/129 |
| 3,496,668 | A * | 2/1970 | Slater et al. | 43/129 |
| 3,548,532 | A * | 12/1970 | Landwer | 43/129 |
| 3,582,496 | A * | 6/1971 | Pfaffenbach | 43/129 |
| 3,623,260 | A * | 11/1971 | Konle | 43/129 |
| 3,656,254 | A * | 4/1972 | Schmedes | A01M 13/00 43/129 |
| 3,727,588 | A * | 4/1973 | Ross | F22B 27/16 122/31.1 |
| 3,811,414 | A * | 5/1974 | Minton | F22B 21/26 122/250 R |

(Continued)

*Primary Examiner* — Gregory Huson
*Assistant Examiner* — Daniel E Namay
(74) *Attorney, Agent, or Firm* — James G. Passé; Passé Intellectual Property, LLC

(57) ABSTRACT

The present invention relates to a hand held device for producing large volumes of smoke from a smoke producing solution. The design allows for repeated, fast, and lengthy heating of the heating chamber, and thus is an improvement over prior devices which can only be utilized in short bursts.

20 Claims, 16 Drawing Sheets

(56) References Cited

U.S. PATENT DOCUMENTS

| | | | | |
|---|---|---|---|---|
| 3,888,415 A * | 6/1975 | Koff et al. | | 239/2.1 |
| 3,982,695 A * | 9/1976 | Burchett | | B05B 7/1613 |
| | | | | 122/250 R |
| 3,986,670 A * | 10/1976 | Syveson | | 239/133 |
| 3,990,987 A * | 11/1976 | Rogers | | B64D 1/20 |
| | | | | 239/171 |
| 4,282,903 A * | 8/1981 | Powell | | 137/893 |
| 4,291,629 A | 9/1981 | Kezer | | |
| 4,326,119 A | 4/1982 | Swiatosz | | |
| 4,349,723 A | 9/1982 | Swiatosz | | |
| 4,658,802 A * | 4/1987 | Schultz | | 126/271.2 A |
| 4,742,643 A * | 5/1988 | Thompson, Jr. | | F24H 1/165 |
| | | | | 122/248 |
| 4,818,843 A * | 4/1989 | Swiatosz | | A62B 27/00 |
| | | | | 392/397 |
| 4,836,452 A * | 6/1989 | Fox | | 239/338 |
| 4,871,115 A | 10/1989 | Hessey | | |
| 4,920,951 A * | 5/1990 | Le Marchand et al. | | 126/403 |
| 4,998,479 A * | 3/1991 | Perham et al. | | 102/334 |
| H000961 H * | 9/1991 | Yu | | F41H 9/06 |
| | | | | 165/154 |
| H001124 H * | 1/1993 | Rouse et al. | | 60/805 |
| 5,222,666 A * | 6/1993 | Gnutel | | A01M 7/006 |
| | | | | 222/146.3 |
| 5,246,675 A * | 9/1993 | Castronovo | | 422/305 |
| D362,043 S * | 9/1995 | Batts et al. | | D22/104 |
| 5,870,524 A * | 2/1999 | Swiatosz | | F41H 9/06 |
| | | | | 392/394 |
| 5,937,141 A * | 8/1999 | Swiatosz | | F22B 1/282 |
| | | | | 392/397 |
| 6,018,615 A * | 1/2000 | Loblick | | F41H 9/06 |
| | | | | 261/142 |
| 6,024,971 A * | 2/2000 | Nachtman | | A01M 29/12 |
| | | | | 424/400 |
| 6,087,935 A * | 7/2000 | Berner et al. | | 340/541 |
| 6,142,009 A * | 11/2000 | Loblick | | 73/40.7 |
| 6,189,453 B1 * | 2/2001 | Lin | | 102/334 |
| 6,260,546 B1 | 7/2001 | Vaughn | | 123/585 |
| 8,236,240 B2 * | 8/2012 | Childers et al. | | 422/28 |
| 2007/0135307 A1 * | 6/2007 | Olson et al. | | 504/313 |
| 2009/0277973 A1 * | 11/2009 | Kennon | | 239/13 |
| 2010/0133354 A1 * | 6/2010 | Vandoninck | | 239/14.1 |
| 2010/0285436 A1 * | 11/2010 | DeVore | | 434/188 |
| 2011/0103778 A1 * | 5/2011 | Batts | | 392/405 |
| 2015/0226530 A1 * | 8/2015 | Batts | | F41H 9/06 |
| | | | | 102/334 |

* cited by examiner

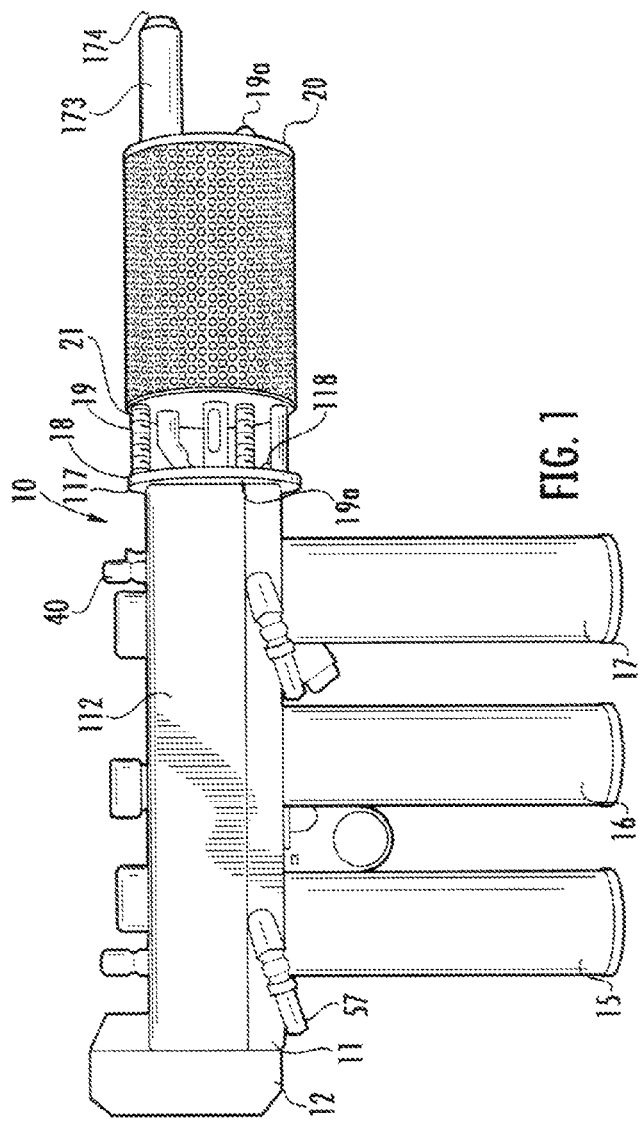
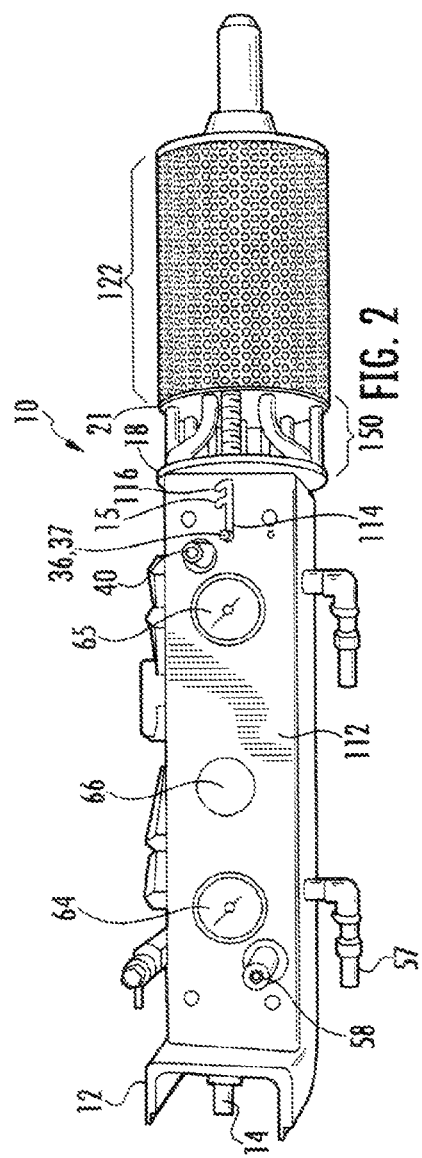
FIG. 1
FIG. 2

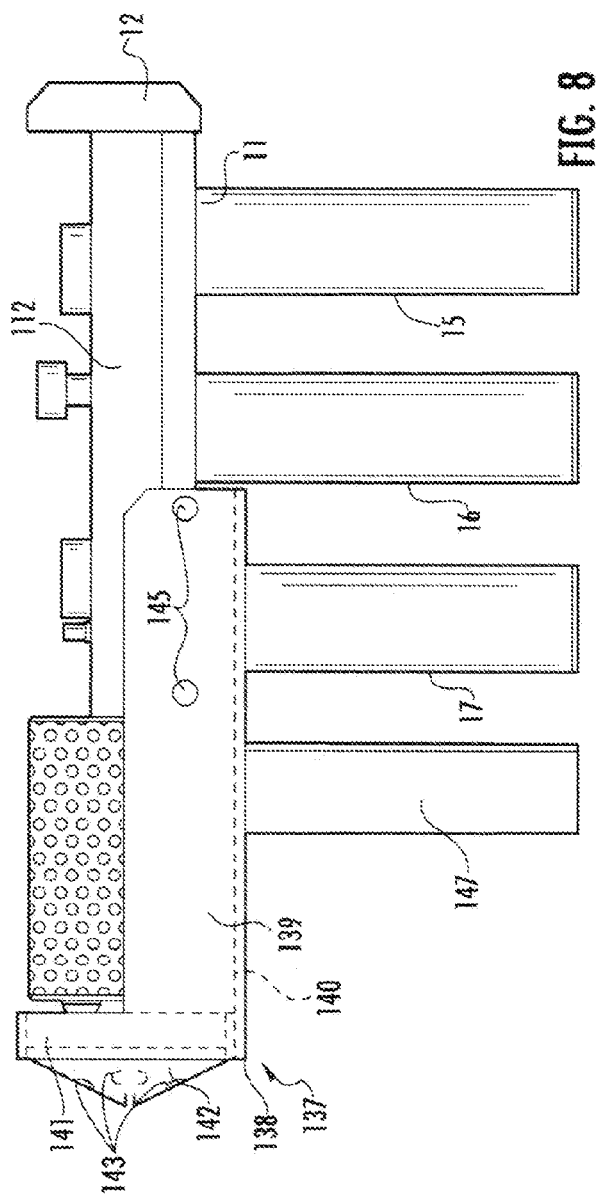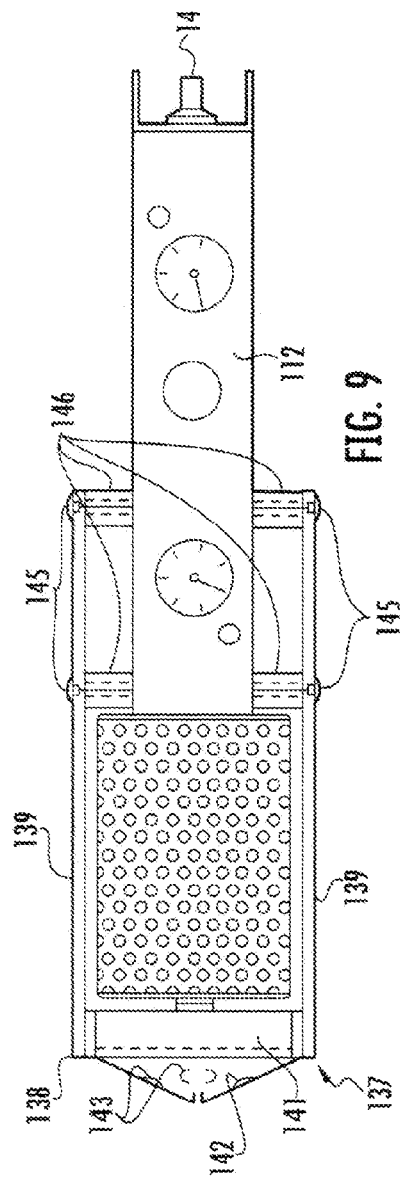

DEVICE FOR GENERATING LARGE VOLUMES OF SMOKE

This application claims priority of U.S. provisional application No. 61/255,998 filed on Oct. 29, 2009 and is included herein in its entirety by reference.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to aerosol generation and, in particular, to a device that is useful for the production of high volumes of non-toxic simulated smoke for industrial use, military use, and the like.

2. Description of Related Art

The generation of a synthetic smoke has been used by the military during combat and training exercises. In addition, it is used by fire departments and police departments for their needs. On the industrial side, theater and motion picture companies frequently use synthetic smoke to simulate smoke for special effects. Typically, these larger uses involve passing a pressurized, smoke producing liquid near a heat source which vaporizes the liquid into a smoke gas. Usually non-toxic, the formulations can be oil or water based depending on the use and the desired effect. The heat source is usually either battery powered or a flame powered by an ignitable gas, such as liquid propane gas (LPG). The smoke producing liquid is usually pressurized by use of some gas that is inert in the process, such as air nitrogen or the like.

In use, the heating source is heated to a given temperature and then the pressurized, smoke producing liquid passes near the heat source vaporizing before exiting a spray or atomizing nozzle of some sort. Because the vaporization of the smoke producing liquid drains heat energy from the heat source, the problem that exists with these devices is that they can only be used for relatively short bursts since heating the liquid also cools the heat source. This is especially true with battery operated heat sources, and even gas fired heat sources have limited capacity to heat before cooling. In addition, smoke generators typically have limited operational capacity for smoke producing liquid prior to replacing the source or refilling them with additional fluid. An example of a device with such problems is exemplified in U.S. Pat. No. 4,998,479 to Perham et al., issued Mar. 12, 1991 which uses a gas burner in an ignition chamber and discharges the smoke generating gas through a heating coil having about 4 turns. The device has limited capacity for gas generating liquid and is only operable for short bursts before cooling below the vaporization temperature of smoke producing liquids since the heat chamber cools very quickly. In addition, the device cannot generate a dense, thick cloud of smoke as is necessary for many industrial uses. A further problem with this and other devices where an ignition spark ignites a gas, is that ignition is very haphazard and igniting the gas can take several tries leading to a dangerous explosive situation if too much gas accumulates in the ignition chamber before the gases ignite.

BRIEF SUMMARY OF THE INVENTION

It has been discovered that venting the ignition chamber to the rear of the chamber allows for the chamber to not vent gasses to the side and increases the retention of heat during use. Even further, by including a spark capture tube, ignition is insured on the first try by capturing gas and regulating where the spark is generated. The present device is essentially self contained and maintenance free. The device can be made to be stand alone, dependent external propellant or fuel, or run both ways.

Accordingly, one embodiment of the invention relates to an aerosol device capable of generating smoke comprising:
 a) a base portion for handling the device during use;
 b) a heating chamber for vaporizing a smoke producing solution having an inlet side and a smoke outlet side the chamber comprising a fuel ignition chamber, one or more combustion gas exit pipe vents on the inlet side or exterior side for the release of combustion gas from the heating chamber, the chamber otherwise sealed for the release of the combustion gas and connected to the base portion;
 c) a smoke producing solution pressurized by a propellant for the solution, operatively connected to the base and capable of delivering the smoke producing solution to coiled tubing positioned within the heating chamber and around the ignition chamber wherein the coil is operatively connected to an exit nozzle which is capable of dispersing the smoke producing solution once it is vaporized in the heating chamber; and
 d) a fuel attached to the base and operably connected to the heating chamber for delivery of the fuel to the ignition chamber for ignition.

Another embodiment relates to an ignition system for lighting a gas fuel in a chamber comprising:
 a) one or more hollow gas collection ignition tubes for positioning within the chamber at least a portion of the side of the tube open to receive gas fuel within the chamber; and
 b) an electric spark igniter corresponding to each hollow tube, the tip of each igniter positioned within the open side portion of the corresponding tube.

Yet another embodiment relates to an aerosol device capable of generating smoke comprising:
 a) a base portion for handling the device during use;
 b) a heating chamber for vaporizing a smoke producing solution having an inlet side and a smoke outlet side the chamber comprising one or more combustion gas exit vents on the inlet side or the heating chamber side for the release of combustion gas from the heating chamber, the chamber otherwise sealed for the release of the combustion gas and connected to the base portion;
 c) a smoke producing solution pressurized by a propellant for the solution, operatively connected to the base and capable of delivering the smoke producing solution to a coiled tubing positioned within the heating chamber wherein the coil is operatively connected to an exit nozzle which is capable of dispersing the smoke producing solution once it is vaporized in the heating chamber; and
 d) a heater for heating the heating chamber to a temperature that will vaporize the smoke producing solution in the coil.

BRIEF DESCRIPTION OF THE DRAWINGS

FIG. 1 is a right side elevational view of the aerosol generator and delivery device of the present invention.

FIG. 2 is a top plan view thereof.

FIG. 8 is a side elevational view of the aerosol generator and delivery system of the present invention with a ram attachment mounted thereon.

FIG. 9 is a top plan view of the ram attachment.

DETAILED DESCRIPTION OF THE INVENTION

Figure 3:
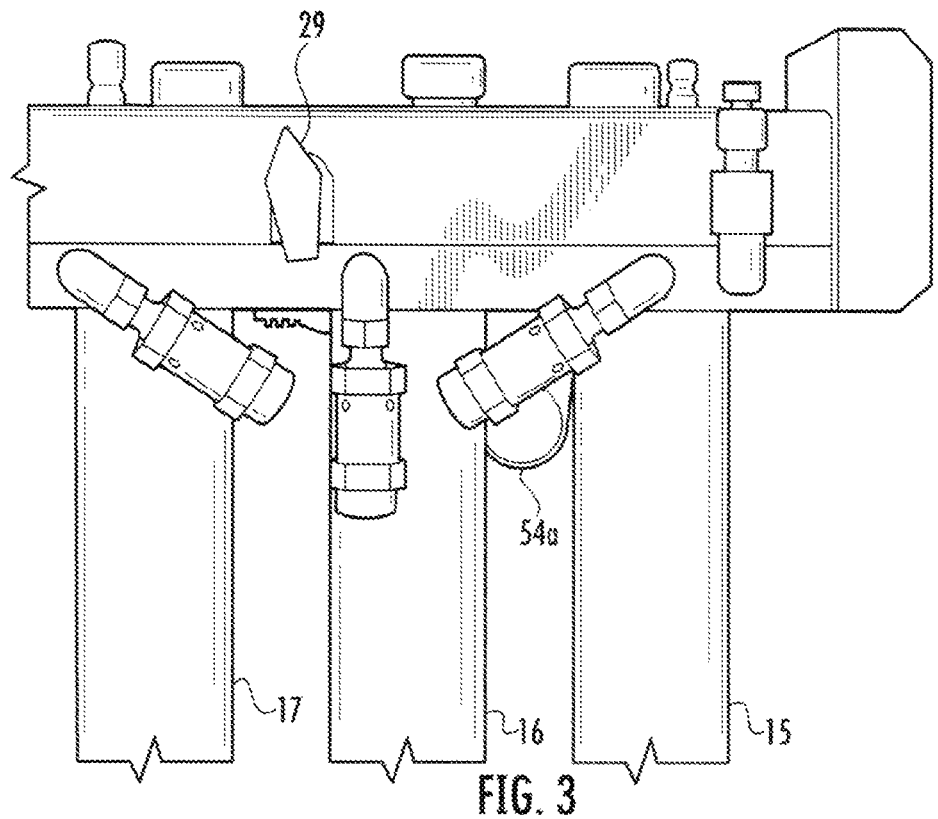
FIG. 3 is a fragmentary left side elevational view of the generator.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

Definitions

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps, or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the phrase "aerosol device capable of generating smoke" refers to a device which can atomize or vaporize a liquid to a gaseous state by rapid heating and discharging the atomized gas to the surrounding environment. This type of device is capable of generating smoke by use of a smoke generating liquid which, when atomized or vaporized by flash heating, produces a synthetic smoke. Likewise, any liquid that one is desirous of converting to a vapor phase by flash vaporization could be utilized in such a device. The present invention is very useful in producing smoke, so while the majority of information relates to the production of smoke, it is understood that other products could be vaporized instead of or with the smoke producing liquid that generates smoke in the device.

As used herein a "smoke producing solution" refers to liquids which, when vaporized in a heat based smoke generating machine, create an artificial smoke. These liquids can be either water or oil based and depending on their particular use can be chosen for their opaqueness, their persistence or lack of persistence or the presence or lack thereof of residual particulate matter. Examples of such liquids (but not limited thereto) include propylene glycol, glycerin, mineral oil, shell ondina oil, and dipropylene glycol. Other ingredients may also be included in the smoke liquids including diluents, such as water, as well as other active ingredients. Secondary ingredients or additives, such as chemicals for dispersion in crowd control (e.g. pepper spray), chemicals for medical treatment or control in a military, other like situations, or for that matter any item to be dispersed quickly in an aerosol manner can be included in the smoke liquid for dispersion by use of the present invention device. One skilled in the art, given this disclosure, could easily select additives for inclusion with the smoke producing liquid in view of the compatibility, dispensability, and the like of the particular additive used in the present invention device. The smoke producing solution can be contained in a canister attached directly to the base, or in other embodiments it can be in a canister or large tank separate from the base, for example, in a backpack or on a floor mounted unit if even larger. It is usually added in a non-pressurized condition so screw fittings and the like can be used to place a cap on the container.

The smoke procuring solution is delivered to the heating chamber via tubing or the like. Within the heating chamber the tubing is coiled to increase the surface area exposed to heat. In one embodiment, the coil winds are tightly wound (touching) and in other embodiments there are 6 or more, 12 or more, or 18 or more coil turns to the tubing before exiting the heating chamber. The tubing, upon exiting the chamber, makes use of a nozzle fitting to control the exiting vapors. A single hole nozzle is standard in the art for smoke generators. However, in one embodiment a novel nozzle has multiple holes to maximize the pattern and can also be fitted with a check valve to prevent back flow.

As used herein, the term "fuel" refers to a burnable substance for delivery to the heating chamber for the purpose of burning the fuel and heating the chamber. This can be a solid, liquid or gas type fuel, as desired, and one skilled in the art can deliver either of these to the heating chamber. In one embodiment the fuel is propane (LPG) or natural gas, which under pressure delivers a gas to the heating chamber. It is clear that other heating sources can be used in the heating chamber. In other embodiments the heat is provided by an electrical heating element. This, in some embodiments, is a battery or electric operated metal, ceramic, or the like, which heats up to a desired temperature upon placing an ac or dc current across the element. Typically, the temperature desirable for the heating chamber is from about 800 to about 1600 degrees Fahrenheit. For example, LPG burns at about 1200 degrees F. The fuel can be contained in a canister and in most embodiments is attached to the base wherein the canister can be refilled or replaced as necessary. It could of course be separate from the base as is the case with propellant and smoke producing solutions.

As used herein, the term "propellant" refers to a gas or other material added to the smoke producing solution so that the solution will travel from where ever it is stored to the heating chamber and out the present invention as smoke. Typical propellants for these solutions include air and nitrogen, though any propellant compatible with the device and the surrounding conditions could be used. In one embodiment the propellant is a vacuum pulling the smoke producing solution to the desired location. Where the fuel needs pressurization, the propellant, either the same or different from the propellant used for the smoke producing solution, could be used to assist the fuel in reaching the heating chamber. The smoke producing solution can be prepressurized, but in one embodiment of the present invention the propellant is in a separate container and delivered to pressurize the smoke producing solution as needed. The propellant can be contained in a canister attached directly to the base or in other embodiments it can be in a canister or large tank separate from the base, for example, in a backpack or on a floor mounted unit if even larger.

The present invention has two basic parts, a base portion and a heating chamber. The base portion is designed to attach things that need or can be kept cooler and to handle the device during use while the heating chamber side is designed to be brought to a temperature that can vaporize the smoke producing solution delivered to the heating chamber. The "heating chamber" can be either heated by a fuel or an electric heating element as described above. The heating chamber will have an inlet side where the smoke producing solution enters the chamber and an outlet side where the smoke exits.

A heating chamber has several elements to it. Two elements that will be in the heating chamber, regardless of how the chamber is heated, are any gases generated from the combustion of fuel or the heating process will not be vented directly out the side of the unit, rather out the inlet side or through side tubes. To release the gases in the chamber in this manner, the chamber is essentially sealed in all directions except for the inlet side which comprises one or more exit vents or tubes positioned in the side. The vents can be any type and positioned around the inlet side of the chamber. They can be of mixed types but sufficient to remove venting gas without substantially allowing heat to be released from the chamber (inlet side or side tubes). One type of vent in the inlet side would be a hollow exhaust pipe or a tube stuck on the outside of the inlet side in communication with the interior of the chamber. Yet another type would be a combustion gas tube placed in the chamber to collect combustion gas and then deliver the gas to the inlet side of the chamber and out of the chamber. Both embodiments can be seen in the drawings and examples which follow. A type of side tube can be seen in the drawings for gathering gas and delivering it out the side by creating an indirect pathway, thus trapping heat but releasing gas. The chamber can be sealed by using insulating material the frame tubing used, or any means that substantially seals the chamber except for exhaust vents to the release of the combustion gases. Of course, it must be sealed in a manner that retains the heat in the chamber as best as is possible, as well. Therefore, use of insulators, ceramics, mantles, and the like can be used. One particular embodiment is shown in the drawings which follow, but clearly other embodiments could be designed in view of the disclosure herein for heating the heating chamber.

Where a fuel is to be ignited in the heating chamber a "spark generator" can be used for igniting the fuel. Spark generators are generally used in the ignition of gasses. Usually they are a metal conductor, sometimes wrapped in a ceramic (a ceramic igniter) and when an electrical current (ac or dc) is applied, a spark travels from the tip of the igniter to a nearby piece of conductive material. An ignition button is positioned on the base portion or elsewhere to engage the igniter for igniting the fuel. In one embodiment there are 2 or more igniters to insure first time ignition especially when used in conjunction with a gas collection ignition tube. Such a gas collection tube is a hollow tube with a portion of the side of the tube removed so that gas can collect within the open side area of the tube. (See the drawings for an example.) The tip of the spark generator can be positioned roughly in the center of the area and since fuel accumulates in the tube open area, it is likely that ignition will occur every time. Once again, a plurality of these tubes can be used to further insure a first time lighting of the fuel. Note where desired, an air inlet including a choke (means to adjust amount of air mixture) may be necessary to ignite the gas. Obviously, while the heating chamber is sealed the air is important to keep the fuel ignited.

The "base portion" is attached to the heating chamber in a convenient manner. In one embodiment there is an insulating material in-between the base and the heating chamber. It is possible that there is a portion of the heating chamber that exists outside the chamber itself, such as the exit vents, the choke, and the like, for purposes of this invention that is still part of the heating chamber. Note, for example, where the insulator is in the drawings. In one embodiment the insulating material is an alumina silica ceramic, such as Alphabond 2300 from Thermal Ceramics. Other materials could also be used and one skilled in the art could chose those insulators in view of the teaching herein. The base portion is designed for mounting tubing, filters, buttons, valves, handles, on/off buttons, wires, canisters (if small enough), gauges, check valves, over flow valves, inlet valves for filling the device, or any part or means that benefits from being attached to the cool part of the device, or the like.

It should be noted that in some embodiments the base is made of aluminum and tubing, fittings and the like are made of stainless steel, niconel or the like, however, selection of other heat resistant materials is within the skill in the art in view of this disclosure.

Figure 5:
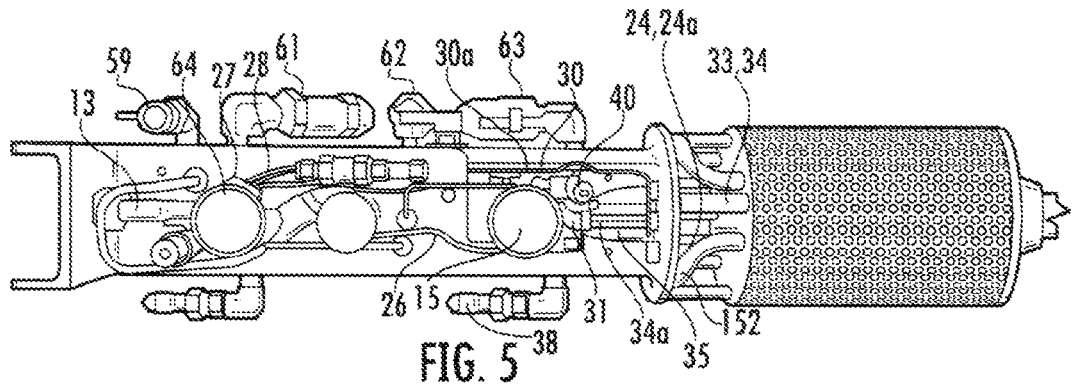
FIG. 5 is a top plan view with the frame housing removed and a partial cutaway of the aerosol generation portion of the aerosol generator and delivery device.

Now referring to the drawings, the Figures will be discussed collectively since understanding of the invention is aided by referring back and forth to the various perspectives of the present invention. In some drawings, the covers on the base are removed and in others the covers are in place. The aerosol generation (including smoke generation) and delivery device of the present invention, indicated generally at 10, includes a base 11 formed from a lightweight material, such as aluminum. The base and other parts of the invention can be left natural or colored, such as by aluminum coatings like anodizing. Fixedly mounted on one end of base 11 is a vertically disposed, channel shaped rear guard 12. An electrical pulse generator 13 is mounted on the rear guard 12 with an ignition button 14 rearwardly projected therefrom as seen clearly in FIG. 5.

A fuel canister 15, aerosol creating solution canister 16, and propellant canister 17 are all vertically mounted to the bottom of base 11 and outwardly project therefrom.

A front base plate 18 is fixedly secured to base 11 by means such as bolts 118. An upper and two side heating chamber mounting rods 19 are secured to front base plate 18 by nuts 19a and outwardly project therefrom. The mounting rods 19 also display heat cooling fins 19b which aid in dissipating heat. On the outer end of chamber mounting rods 19 is an outlet side heat chamber cap 20 that is held in place by nuts 19a. Mounted on the heat chamber mounting rods 19, intermediate the front base plate 18 and the outlet side heat chamber cap 20, is inlet side heat chamber cap 21.

An igniter 24 passes through inlet side heat chamber cap 21 and is mounted thereon; it is hidden behind igniter heat shield 24a. It should be noted that two or more igniters can be used to add redundancy to the ignition process. The igniter 24 also passes through inlet side heat chamber cap 21 with the end thereof being disposed in the burner chamber of the heating chamber 160. The electrical pulse generator 13 is connected to igniter 24 by way of wire 26.

When the ignition button 14 is pushed, the electrical pulse generator will send an electrical pulse through wire 26 to the dual ignition 24 which will cause a spark to be created at the tip 25 of both igniters. Since electrical ignition systems of this type are well known to those skilled in the art, further detailed discussion of the same is not deemed necessary.

Fitting 27 is mounted on base 11 and communicates with the interior of fuel canister 15. Fuel line 28 is communicatively connected at one end to fitting 27 and at the other end to fuel filter 28a (not shown but inside fuel canister is a check valve) and then in turn to fuel cutoff valve 29, which is also mounted on base 11. Fuel line 28 is connected between cutoff valve 29 and the inlet side of fitting 30a mounted on base 11. The outlet side of fitting 30a is connected to one end of fuel line 31 with the other end being connected to the gas burner, indicated generally at 160.

An air mixing orifice housing 33 forms part of the gas burner 160. An air control sleeve 34 is longitudinally mounted on air mixing orifice housing 33. A shoulder 34a is provided on the rear portion of control sleeve 34 with a coil spring 35 disposed about the exterior of the sleeve between the rear of the front base plate 18 and shoulder 34a to bias the sleeve rearwardly.

Figure 6:
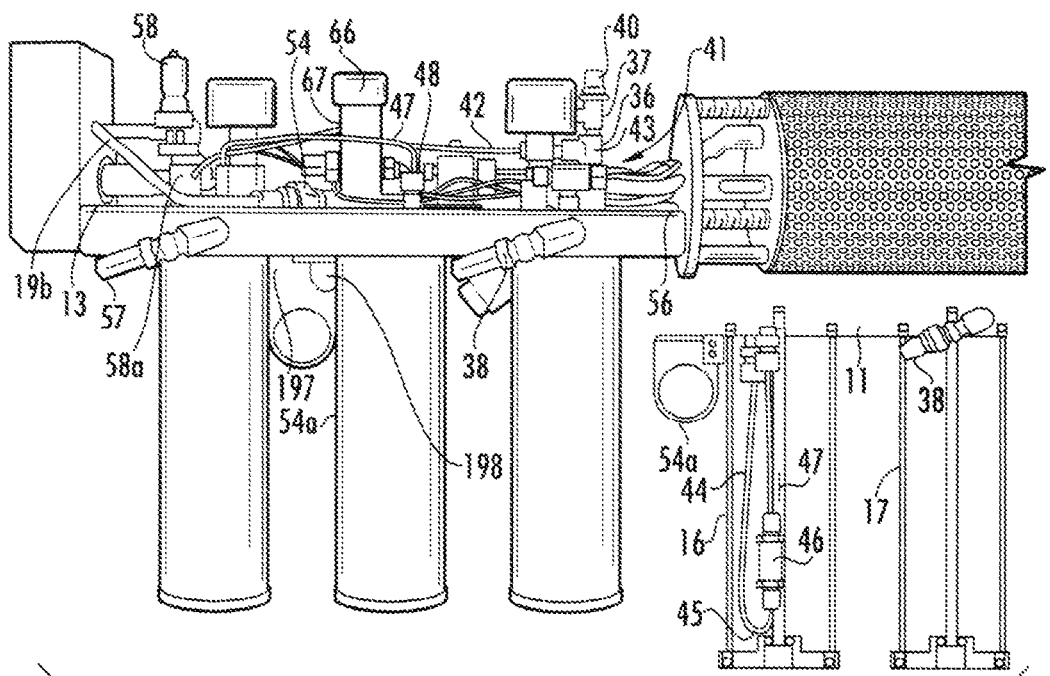
FIG. 6 is a right side elevational view with the frame housing removed and showing a partial cutaway view of the aerosol generation portion of the aerosol generator and delivery device.

An air flow adjuster lever 36 is fixedly secured to the upper portion of sleeve shoulder 34a at one end and has a manipulating handle 37 at the opposite end thereof as can clearly be seen in FIG. 6.

A fuel quick connector coupling 38 is mounted on the right side of base 11. This connector is communicatively connected to fuel line fitting 30 as indicated.

A propellant quick connector nipple 40 is mounted on elbow 43. Fitting 41 connects to base 11 and communicates with the interior of propellant canister 17 and with elbow 43. The inlet end of flexible line 44 is connected to the lower end of a fitting. At the bottom of the loop in flexible line 44 is a solution inlet orifice 45. A one way check valve 46 is provided in flexible line 44 above orifice 45 to allow propellant and the solution picked up through orifice 45 to pass in the direction of arrow 47 while preventing flow in the opposite direction.

Flexible line 44 passes from check valve 46 into fitting 48 mounted on base 11. Fitting 48 operatively connects line 49 to a fitting for further distribution of propellant and solution.

An internal passage within base 11 communicates between propellant solution and quick connect coupling 57. A line connects trigger activated valve 54 (with trigger 54a). This valve 54 is in turn operatively connected to line 55 at one end with the other end being connected to coil inlet 56.

A fuel quick connector nipple 58 is mounted on fitting 58a which is mounted on base 11 and communicates with the interior of fuel canister 15.

A liquid level gauge 59 is mounted on the left side of base 11 with a tube extending therefrom into the interior of fuel canister 15. When the canister is being filled through coupling 58 and the liquid level reaches the desired level, this is noted on the gauge 59. The fueling of the canister can then be stopped. The purpose of this is that safety regulations do not allow the canister to be filled more than 80% full.

A fuel relief valve 61, set at preferably 450 psi, is mounted on the left side of base 11 and communicates with the interior of fuel canister 15. A propellant/solution relief valve 62 is also mounted on the left side of base 11 and communicates with the interior of solution canister 16. This relief valve is also preferably set at 700 psi. Finally, a propellant relief valve 63 mounted on the left side of base 11 and communicates with the interior of propellant canister 17 and is set at 700 psi. The purpose of the relief valves 61, 62 and 63 is to keep the canisters from exceeding a select pressure. Over filling of a cylinder could cause a cylinder to explode, and thus, their presence is a safety factor in using these devices. The pressure relief valves can be fixed pressure or in one embodiment one or more is an adjustable pressure.

A standard pressure gauge 64 is mounted on base 11 and communicates with the interior of fuel canister 15. A second pressure gauge 65 is mounted on base 11 and communicates with the interior of propellant canister 16.

A screw cap 66 acts as a closer for neck 67 that communicates with the interior of solution canister 16 so that the canister can be filled with solution, such as smoke solution.

Figure 12:
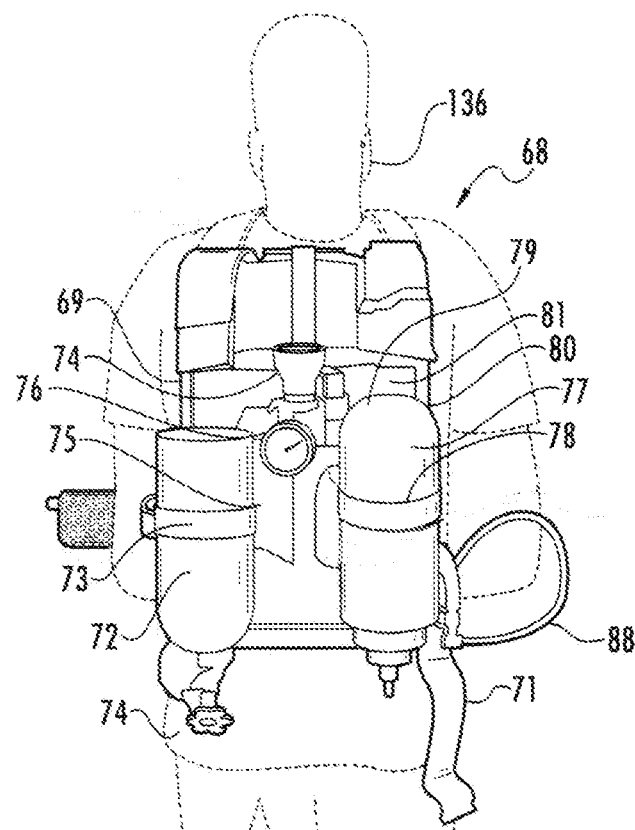
FIG. 12 is a perspective view of backpack mounted propellant, solution and fuel tanks.
Figure 13:
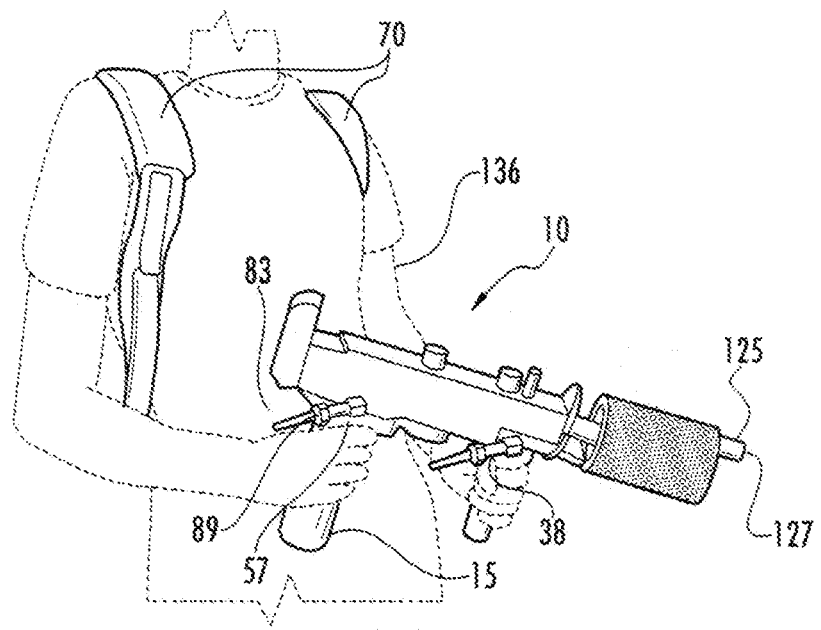
FIG. 13 is a front elevational view of the user of the aerosol generator and delivery system of the present invention with the backpack inlet lines connected to such generator.
Figure 14:
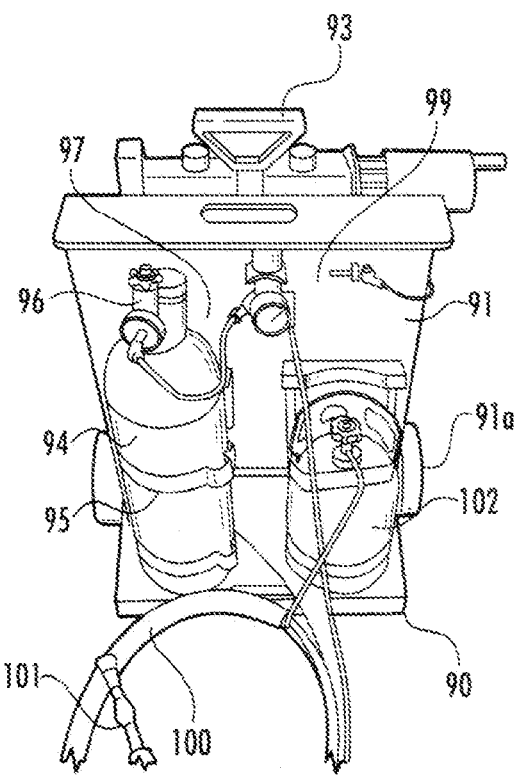
FIG. 14 is a front perspective view of the recharging station used in conjunction with the present invention.
Figure 15:
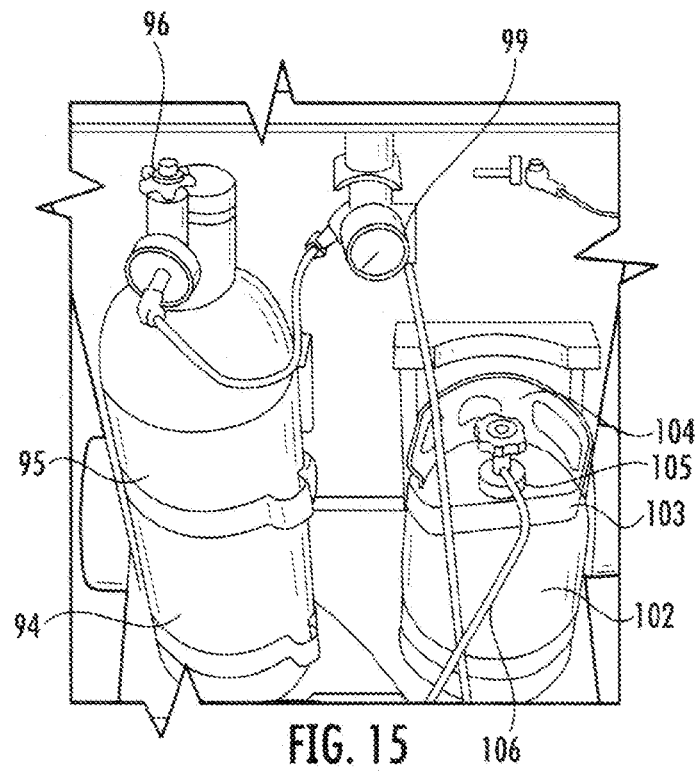
FIG. 15 is a close-up front perspective view of such stations.

Since the fuel, solution and propellant canisters 15, 16 and 17 are of limited capacity, a backpack supply, indicated generally at 68, is provided in FIGS. 12 and 13. A backpack frame 69 has standard adjustable shoulder straps 70 and an adjustable waist strap 71. Since backpack frames, shoulder straps, and waist straps are well known to those skilled in the art, further detailed discussion of the same is not deemed necessary.

A propellant tank 72 is mounted on backpack frame 69 by adjustable straps 73. A standard cut-off valve 74 is mounted on tank 72. Line 75 communicates between valve 74 and pressure gauge 76.

Figure 7:
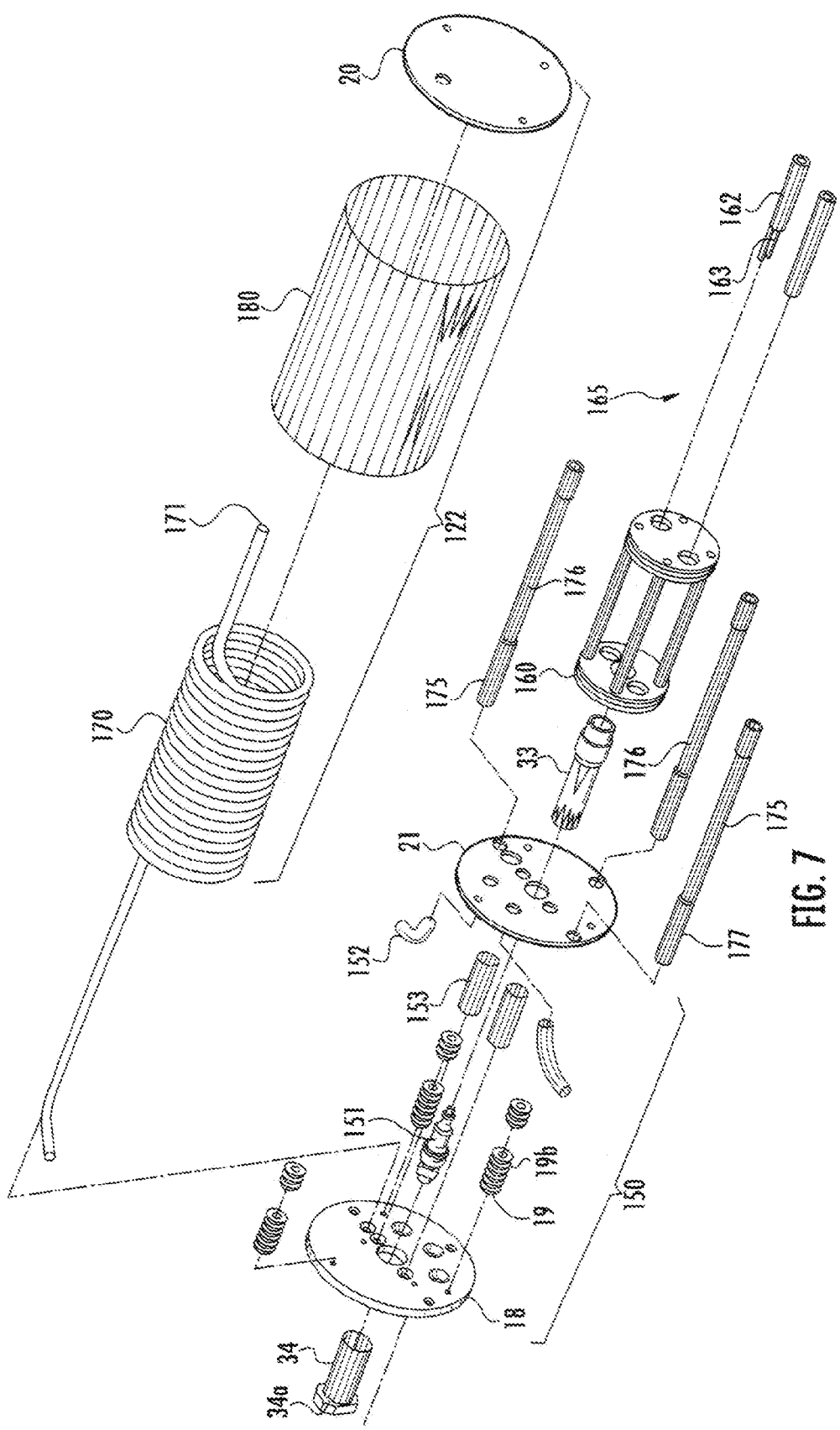
FIG. 7 is an exploded view of the heating chamber that generates the aerosol.
Figure 21:
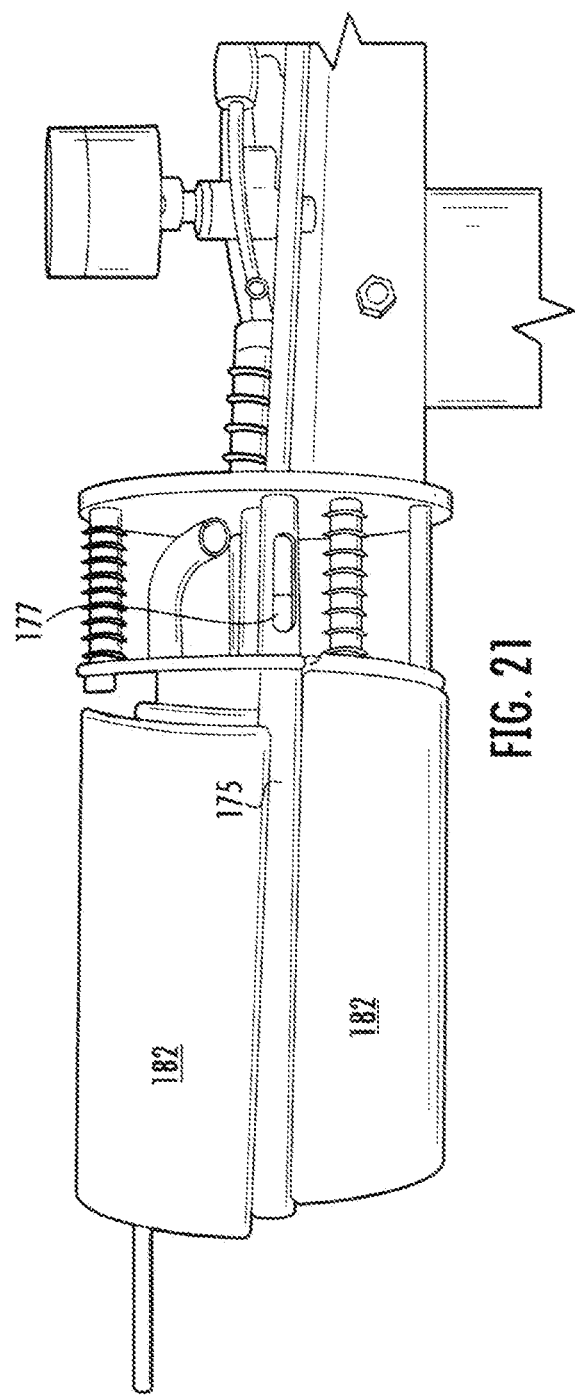
FIG. 21 is a view of the ceramic insulators used in the heating chamber.

A solution tank 77 is mounted on backpack frame 69 and is held in place by adjustable straps 78. A valve 79 on solution tank 77 communicates through line 80 to mixing valve 81. This mixing valve is also connected to line 75 from propellant tank 72. Mixing valve 81 also communicates with one end of line 82. The other of this line has a quick connect coupling 83 adapted to be connected to propellant/solution quick connect 57 on the rear portion of base 11 of aerosol generation and delivery device 10.

In FIGS. 14 and 15, a recharging station, indicated generally at 90, is used for recharging the pressurized fuel and propellant canisters of the aerosol generation and delivery device 10. The solution contained within canister 16 is non-pressurized when being filled and the solution is poured into neck 67 after the screw cap 66 has been removed.

The recharging station 90 includes a horizontal frame 91 with wheels 91*a* rotatively mounted on opposite ends thereof. A vertical frame 92 is secured to horizontal frame 91 at one end with a handle 93 being provided on the other end.

A propellant tank 94 is mounted on one side of vertical frame 92 and is held in place by adjustable straps 95.

A standard tank valve 96 is mounted on propellant tank 94. One end of line 97 is connected to valve 96 with the other end being connected to a fitting. This fitting communicates with propellant pressure gauge 99. The fitting is also connected to one end of line 100 with the other end connected to propellant quick connect coupling 101 which can be attached to coupling 40 on generator 10 for filling propellant canisters 16 and 17.

Fuel tank 102 is mounted on the opposite side of vertical frame 92 from propellant tank 94 and is held in place by adjustable strap 103.

A standard tank cut-off valve 104 is provided on fuel tank 102 and is connected to the LPG connector 105. One end of fuel line 106 is connected to LPG connector 105 with the other end of the connector being connected to a propane shut-off valve 104. Line 106 connects to fitting 101 which can connect to nipple 58. The fitting 101 is out fitted with shut-off valve 110. Fitting 101, when connected to fuel quick connect nipple 58, can be used to fill fuel canister 15 up to 80% when the liquid fuel enters the tube to give a visual reading on site gauge 64. The refueling process will be stopped at that point.

The solution canister 16, which is not pressurized during filling, can be filled through neck 67 after screw cap 66 has been removed as needed. After the solution canister has been filled and the screw cap 66 is replaced, such canister can be charged by the propellant prior to the generation of smoke by the smoke generator 10.

A base housing 112 is mounted above base 11 and is secured in place by means such as screws. Exteriorly exposed above base housing 112 is fuel quick connect coupling 58, fuel pressure gauge 64, solution filler screw cap 66, propellant pressure gauge 65, propellant quick connect coupling 40, and air flow adjuster lever 36 and its manipulating handle 37 as can clearly be seen in FIGS. 1 and 2.

The air flow adjusting lever 36 passes through longitudinal slot 114 in the base housing 12. This air flow adjusting lever slot has two L-shaped locking slots 115 and 116 on one side thereof as can clearly be seen in FIG. 2. When the air flow adjusting lever 36 is in the position shown in FIG. 2, the air control sleeve 34, against the bias of spring 35, will be in its most open position relative to the mixing orifice housing 33 of gas burner 160. When the lever 36 is manipulated by handle 37 and placed in L-shaped slot 115 and is held in place by the bias of spring 35, sleeve 34 partially closes the air mixing orifice housing 33. When the lever 36 is in L-shaped slot 116, the air control sleeve 34 closes off even more of the air mixing orifice housing 33 of burner 160.

An insulating plate 117 is mounted between the front base plate 18 and base 11. The base plate and the insulating plate are held in place by means such as bolts 118 that are threaded into base 11.

Insulating plate 117 is made from a material that is commonly referred to as Alphabond 2300 which will eliminate over 70% of the heat that is generated in the heating chamber, indicated generally at 122, from being transferred to the base 11. The operation of the heating chamber 122 will hereinafter be described in greater detail.

In FIG. 7 we have an exploded view of heating chamber 122 and the air inlet/exit area 150 which is bound by base front plate 18 and inlet side heat chamber cap 21.

The area 150 consists of several elements which are visible in other figures but for clarity are shown here in exploded view. Note that this area, among other purposes, is designed to keep the base cool by providing either insulation or cooling function to the heat generated in the heating chamber 122. It is also designed to be an area for air inlet and for at least some air/heat expulsion.

The fuel line passes into the air area 150 and reaches the propane orifice 151 where the orifice, modulated by the control sleeve 34, mixes fuel and air to the desired mixture (note, spring 56 which helps modulate sleeve 34 is not shown but can be seen in FIGS. 5 and 6). This can be valuable when starting the device, i.e. use as a choke mechanism. The fuel line passes through inlet side chamber cap 21 and into the heating chamber 122. The area 150 is also where combustion gas vent pipes 152 are positioned. The gas vent pipes 152 are positioned in area 150 to aid in removing combustion gases without significantly impacting the heat remaining in the heating chamber 122. By back venting the gases, the chamber retains more heat than direct side venting (i.e. having a direct side opening for gases to escape), and thus, allows the unit to act more efficiently and retain heat longer. Also, igniter protective housing sleeves 153 insulate and transfer heat away from igniters 24 passing through the sleeves 153 in this area on their way to the heating chamber 122.

A mixture of fuel and air are delivered to the heating chamber by mixing orifice 34 and specifically to the inner ignition chamber 160 via opening 34*a*. Positioned inside the chamber 160 are gas fuel collection tubes 162. The gas collection tubes 162, one for each igniter, help concentrate fuel in opening 163. By positioning igniter tip 25 in opening 163, a first time ignition is mostly guaranteed. By utilizing two or more igniters 24, first time ignition is even further guaranteed. Igniters 24 are left out of FIG. 7 for clarity, but are shown in FIG. 18 positioned in a collection tube 162 in larger detail.

Ignition chamber 160 is then covered with heating mantle 165. In operation, the air/gas mixture is delivered to ignition chamber 160, the igniters 24 are engaged and the fuel in the ignition chamber 160 is ignited. Because of mantle 165, the flame is contained in the chamber 160 as it would be inside a mantle on a gas camping lantern. The mantel 165, in one embodiment, is a wire mesh made from a material, such as Inconel wire mesh, which will withstand temperatures well above 3000 degrees Fahrenheit.

Positioned around the ignition chamber 160 is stainless steel coil tubing 170 which contains the propellant/smoke material. It has been found from experience that coils 160 lying in juxtaposition to each other give superior combustion results over coils with fewer turns and/or that are spaced apart. In one embodiment there are 6 coils, in another there are 18 or more coils.

The heat from the ignition chamber 160 heats the smoke producing liquid to vaporization wherein it exits the coil at 171 before exiting nozzle 173. Nozzle 173 has an axial opening 174 therein so that smoke created by combustion within coils 170 can be emitted therefrom. (Either single exit port or multiple port, as shown in FIGS. 19, 19*a*, 19*b* and 19*c*, can be utilized). In order to further reduce combustion gases, again while minimizing heat loss from heating chamber 122, exhaust tubes 175 are utilized. The exhaust tubes 175 have exhaust collection ports 176 which are positioned toward the ignition chamber for collecting combustion gas and exit vent 177 for expelling the gas to the atmosphere. As can be seen, a plurality of exhaust tubes 175 are positioned in between the inlet side cap 21 and the outlet side cap 20 at the periphery of those caps. Obviously, the exhaust vent 177 is facing the exterior on a radius with the center of the ignition chamber 160. These tabs also help retain heat. Also, positioned around the periphery are ceramic panels 182 which then seal the interior of the heating chamber 122 from severe heat loss compared with an open vent to the atmosphere situation. These panels can be made from an inorganic silica binder that will not smoke or produce noxious fumes during initial and subsequent firings. In one embodiment, these panels are made from a material sold under the trade name Alfabond 2300-H, which maintains its structural and mechanical strength and will not burn out. Materials other than ceramic (or other ceramics) could be used if they serve the same function and purpose. In the example of the drawings, 3 pieces of ceramic 182 are utilized and spaced by gas collection tubes 162, but more or less pieces will be used based on how many, if at all, collection tubes 162 are utilized. Over the ceramic 182 and tubes 175 is placed a heat shield 180. The shield 180 holds the ceramics 182 in place and further aids in holding heat to prevent or at least slow heat dissipation. The heat shield can be perforated as shown in FIGS. 1 and 2 in order to allow for combustion gas to escape. The ceramics 182 are shown in FIG. 21 and left out of FIG. 7 for clarity purposes. Not shown is an optional heating chamber nozzle burn cover, this over is designed to further retain heat and prevent accidental burns from the heating chamber. In one embodiment, the inner layer is fiber glass insulation, about ¼ to ¾ inches thick, with a center shell of a Kevlar/Nomex material. Other materials could also be utilized and is within the skill in the art.

Figure 4:
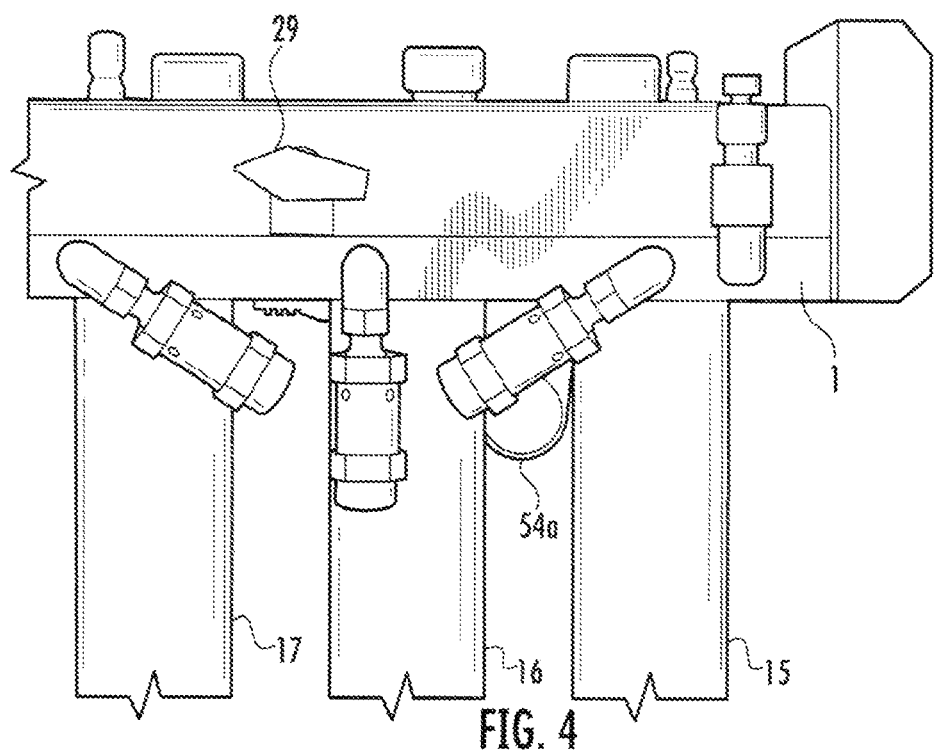
FIG. 4 is a fragmentary view showing the fuel cutoff valve in the on position.

Turning back to FIG. 3 and FIG. 4, the fuel valve 29 is shown in the off position in FIG. 3 while shown in the on position in FIG. 4. The fuel valve 29 can also be fitted with a locking means if desired.

The ram attachment, indicated generally at 137, as in FIGS. 8 through 11, is designed for use in police and military operations to protect the smoke generator during riot control, while flushing fugitives from building enclosures, and the like.

The ram attachment is composed of a channel member 138 having side walls 139 and a bottom 140.

The front of the channel member 138 includes a ring 141 that is secured to the side walls 139 and bottom 140 by means such as weldment. An outwardly projecting concave plate 142 is secured to ring 141 by weldment or other suitable means. This plate has a plurality of openings 143 therein for dissipating heat as well as the upper opening being aligned with the opening 127 in nozzle 125 so that smoke can pass through such plate.

Figure 10:
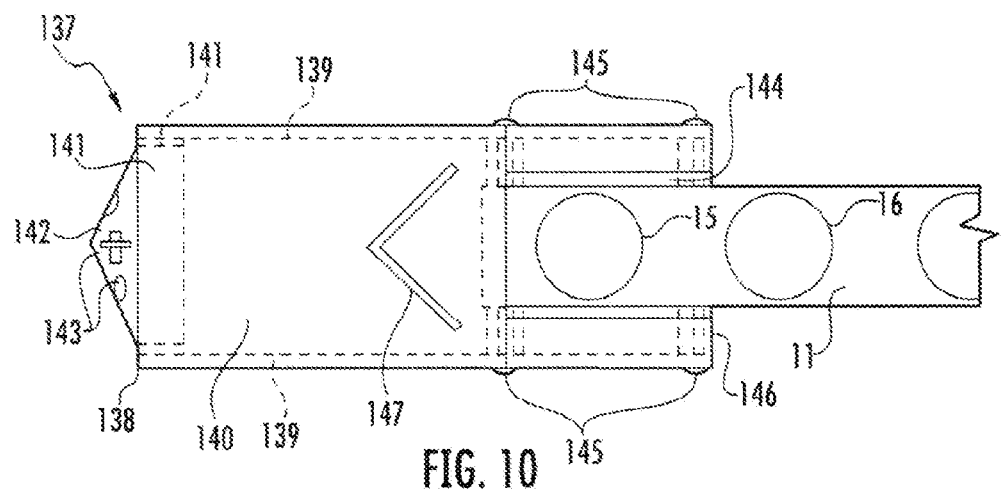
FIG. 10 is a bottom plan view thereof.
Figure 11:
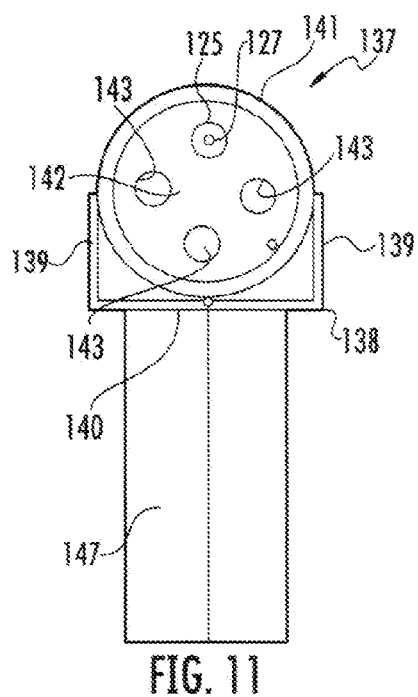
FIG. 11 is a front elevational view of such ram.

In the rear portion of the bottom 140 of channel member 138 has a 13-shaped opening 144 therein which allows the propellant canister 15 to project downwardly therethrough as shown particularly clear in FIG. 10.

A plurality of bolts or other suitable securing means 145 pass-through the side walls 139 of channel member 138 as well as through spacers 146 and into base 11 of the smoke generator 10 to firmly hold the ram attachment 137 in place on said generator.

Finally, a V-shaped canister guard 147 is secured to the bottom 140 of channel member 138 by weldment or other suitable means and downwardly extends therefrom as can clearly be seen in FIG. 8 and FIG. 10.

The ram attachment 137 can be quickly attached to the smoke generator 10 of the present invention by inserting bolts 145 and tightening the same. The ram attachment can be just as readily removed by simply loosening such bolts and moving the attachment away from the generator.

Figure 16:
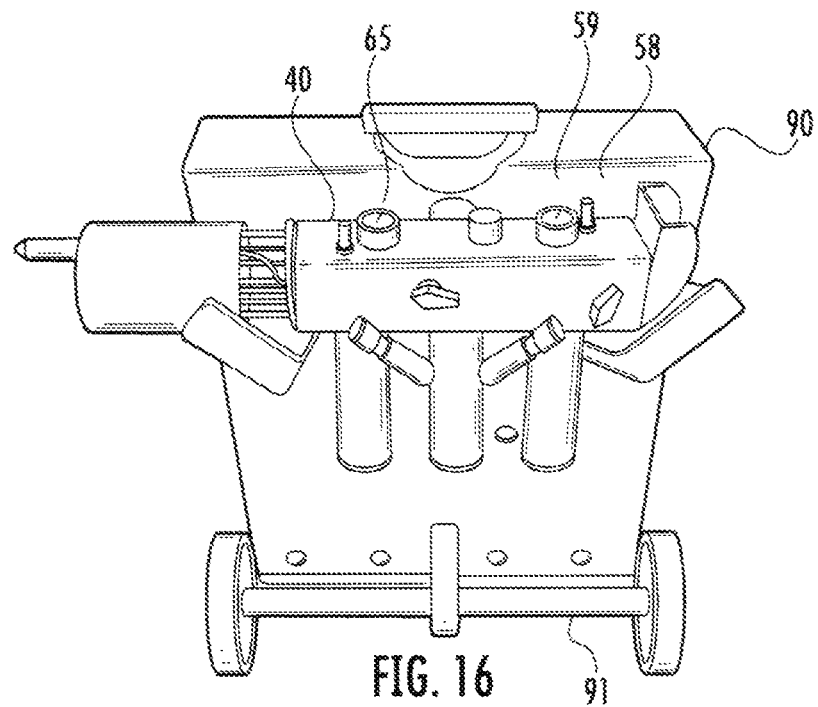
FIG. 16 is a perspective view of the recharging station with the aerosol generator resting thereon.
Figure 17:
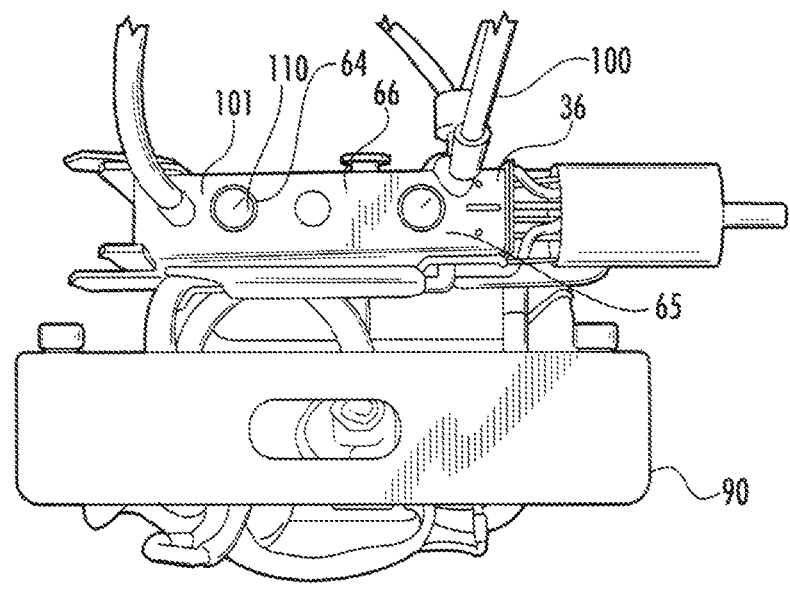
FIG. 17 is a top view of FIG. 16.
Figure 18:
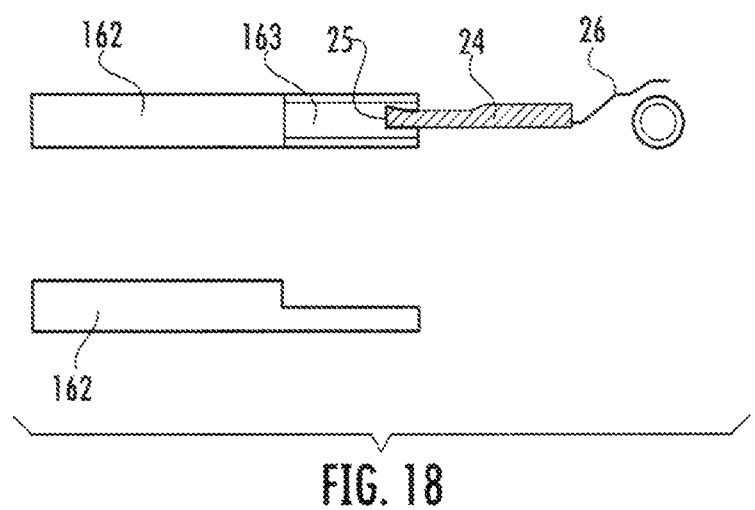
FIG. 18 is a front and side perspective view of a spark igniter positioned in a gas collection substitute tube drawing.

To use smoke generator 10 of the present invention as an independent unit, the fuel, propellant and solution canisters must be filled. If the recharging station 90 is used, the canisters 15, 16 and 17 are placed on pads as shown in FIG. 16.

The fuel quick connect coupling 101 is placed in operative engagement with fuel quick filling nipple 58. Valve 104 is opened, as is valve 110, to allow fuel to flow into fuel canister 15 until it reaches desired full capacity. This is visually seen on site gauge 59. Valve 110 is then shut off, as is tank valve 104, and the coupling is disconnected from nipple 58.

Screw cap 66 on solution filling neck 67 is removed and liquid solution is poured from a suitable container (not shown) into the neck until the solution canister 16 is full. The screw cap 66 is then replaced. The smoke generator of the present invention is now charged and ready for operation.

Propellant quick connect coupling 101 is then connected to propellant quick coupling 40 on smoke generator 10. The propellant tank valve 96 is opened as is valve of coupling 101. The propellant canister 17 is then filled until the desired pressure is reached. The valves are then closed and coupling 101 disconnected from coupling 40.

Handle 37 is adjusted in slot 114 for the proper setting of air control sleeve 34 on the air mixing orifice housing 33 of gas burner 160. The cut-off valve 29 is now moved to the on position.

The igniter button 14 is then pushed which will cause the electrical igniter 13 to send an electrical pulse through a wire into igniter 24 which will cause an electrical arc at the tip 25 of the igniter 24. Since the fuel cut-off valve is open, gas will flow from the canister to the line 28, to the shut-off valve 29 and then from there through line 31 to burner 160 with the fuel/air mixture coming out the end 33 into burner chamber 160. At this point the igniter will ignite the fuel in said ignition chamber 160.

Due to the size and configuration of the device, within approximately 45 seconds adequate heat buildup will have occurred to combust the smoke solution passing through coils 170, thus in less than one minute after firing off burner chamber 160, the smoke generator of the present invention is ready to use.

The propellant from charged canister 17 passes through line 42 where the pressurized propellant enters flexible line 44 in solution chamber 16. The pressurized propellant and the solution picked up through orifice 45 passed through check valve 46 and out the fitting 48. This fitting is connected through line 49 which, through an internal passage, carries the propellant and solution to trigger activated valve 54. The propellant/solution system is thus, charged and ready to operate.

Once the burner 160 has reached operating temperature, the user grasps the smoke generator as shown in FIG. 13. When desired, the user simply pulls the trigger mechanism 54a downwardly with his or her finger which opens valve 54. Pressurized propellant/solution then passes into coil 170. As this propellant/solution passes through coil 170, the solution is combusted. When the combusted solution exits coil outlet 171 through nozzle 173, heavy non-toxic smoke is emitted therefrom so long as trigger mechanism 54a holds valve 54 open. By manipulating said trigger 54a short bursts of smoke can be generated or continuous smoke can be generated as desired.

When the smoke generator 10 is operated as a self contained unit, it can generate smoke for a cumulative time of approximately 45 minutes. This includes the time it is operated during short bursts as well as extended smoke generation.

Once the smoke generator has exhausted the charges in canisters 15, 16, and 17, it must be recharged prior to further use. This can be accomplished herein as described above for the initial charging, of such generator at the recharging station 90 or by other suitable recharging arrangements.

Recharging the smoke generator 10 using the recharging station 90 takes approximately three minutes before the generator is again ready for operation.

When it is desired to operate the smoke generator of the present invention for extended periods of time, the back pack supply 68 is available.

The user 136 straps the back pack on, using shoulder straps 70 and waist strap 71 and makes adjustments for a comfortable fit.

The propellant/solution quick connect coupling 89 on line 88 is operatively connected to propellant/solution quick connect coupling 57 on base 11. The fuel quick connect coupling on fuel line (not shown) is operatively connected to fuel quick connect nipple 38 mounted on base 11. The propellant, solution and fuel valves 74 and 79 are then opened, allowing propellant and solution from tanks 72 and 77 to flow to the smoke generator 10 through quick connect nipple 57. Fuel from tank 102 or other source is allowed to flow to the smoke generator through quick connect nipple 38.

The smoke gun 10 is now ready for operation. The fuel can be turned on to burner 160 as herein above described and the ignition button 14 pushed to ignite the fuel in burner chamber 160. After approximately 45 seconds heat up time, the trigger mechanism 54a can be manipulated to produce nontoxic smoke from the tip 174 of nozzle 173 in the same operating manner as herein described above for the generator when used as a self contained unit. The only difference is that, due to the larger capacity of the tanks on the back pack 68, smoke can be generated for a cumulative time of between 2½ and 3 hours.

Once the supply in the back pack 68 has been exhausted, the valves can be closed and connectors 83 and 89 disconnected and the back pack removed from the user 136. A fully charged back pack can then be put on and couplings 83 and 89 reconnected. The smoke generator 10 is now again ready for operation for an extended period of time as herein described above.

Figure 19:
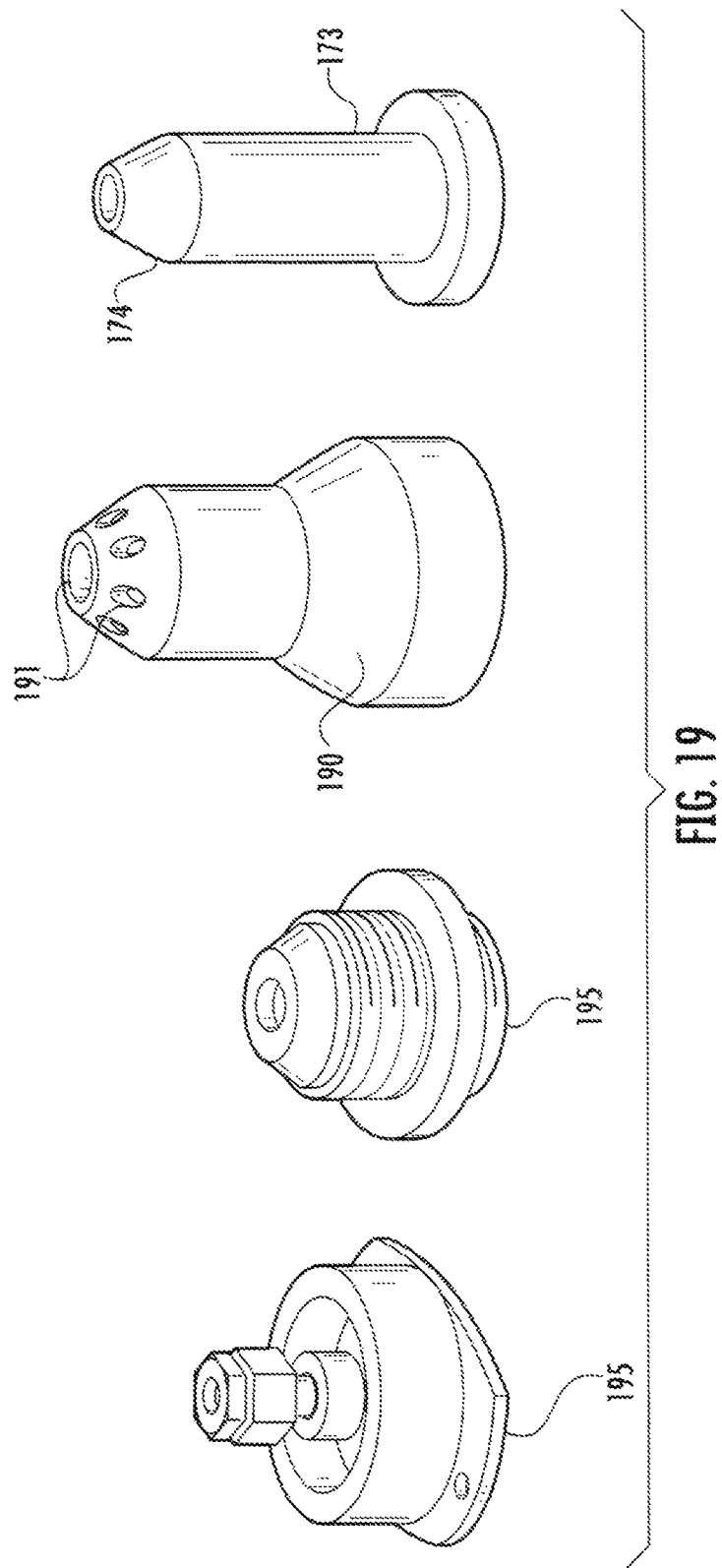
FIGS. 19, 19a, 19b and 19c depict an exploded view and assembled view of an exit nozzle having single and multiple exit holes and a check valve.
Figure 19A:
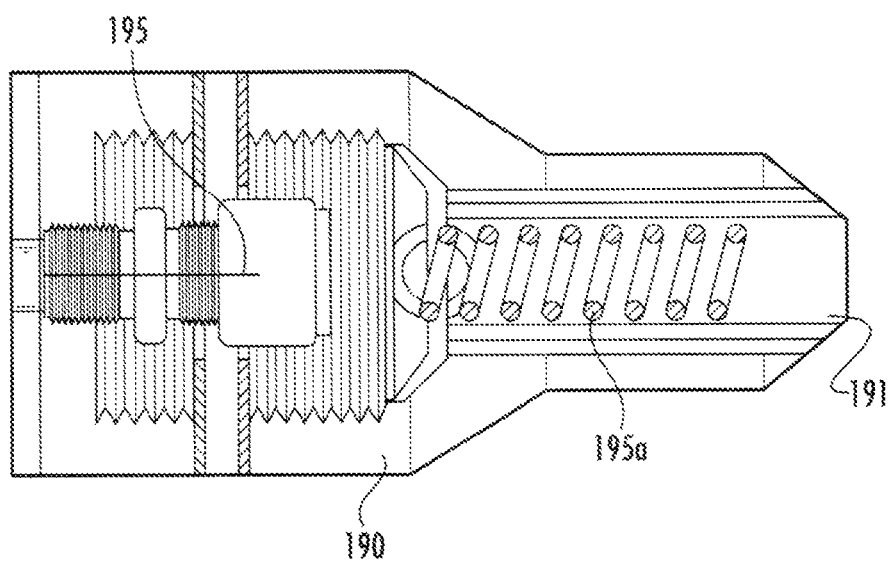
Figure 19B:
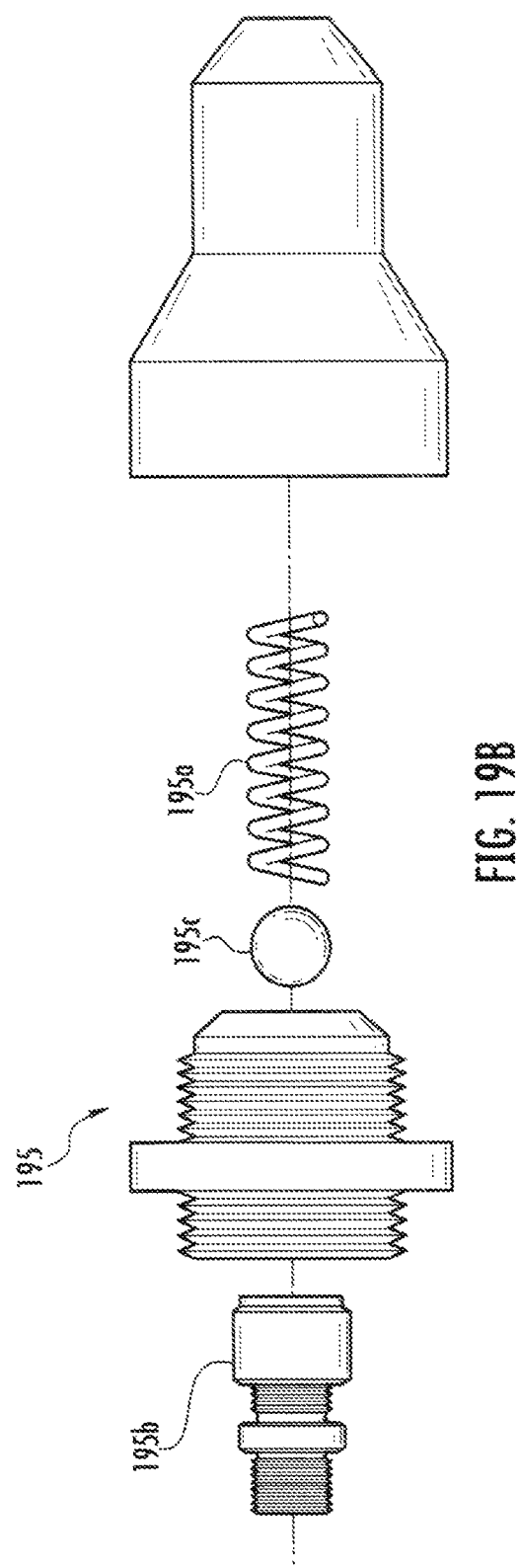
Figure 19C:
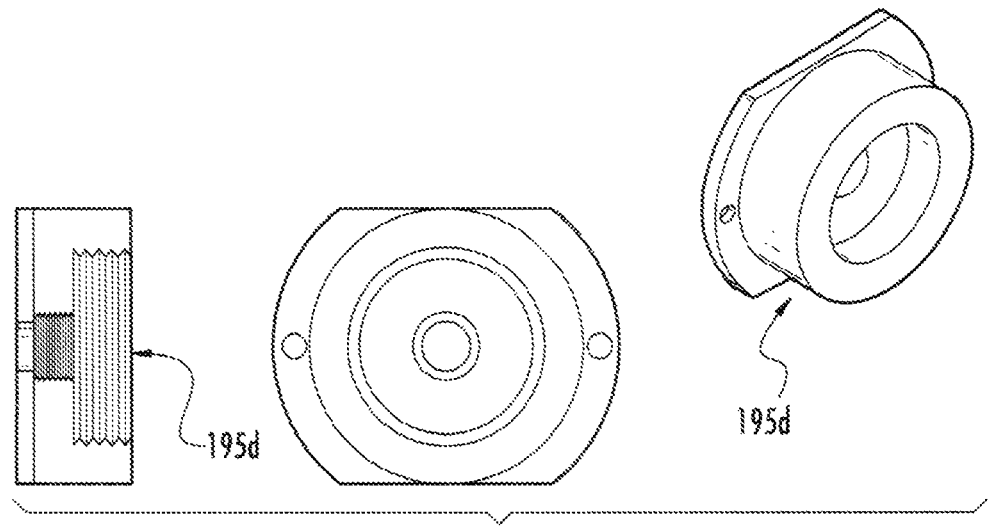
Figure 20:
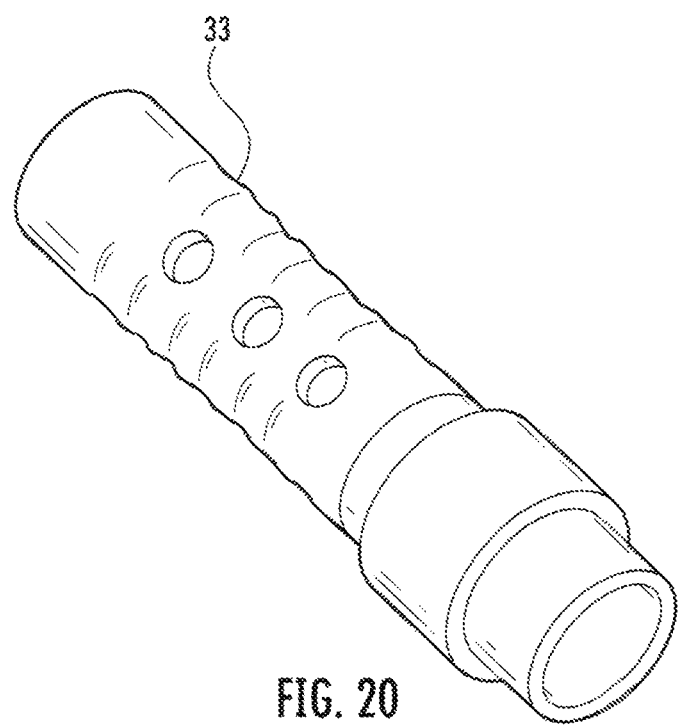
FIG. 20 is a perspective view of the air flow channel in larger view than FIG. 7.

Lastly, FIGS. 19 through 19c depict two different versions of nozzles for use in the present device. Nozzle 173 with single exit 174 is shown on the far right of the picture. This is the nozzle shown in other Figures of the drawings. Nozzle 190 with multiple holes 191 is depicted, which allows for a different dispersal pattern than does nozzle 173. The nozzle 190 is also fitted with check valve 195 which is two pieces as shown and fits inside nozzle 190. FIG. 19a and FIG. 19b show a see through version of nozzle 190, completely assembled and exploded. Connector fitting 195b attaches to check valve 195. It is operated by spring 195a and ball bearing 195c. The entire nozzle is mounted using mounting bracket 195d in FIG. 19c.

Regarding trigger 54a operation, solution tube 196 supplies smoke solution to the trigger 54a. Operating trigger 54a opens a valve which allows solution to pass to the heating chamber coils. How much solution will pass can be adjusted by set screw 197 which determines how far the trigger can be pulled and thus, how far open the valve can be, Engaging trigger 54a is in a forwards and backwards motion, typical for most triggers. In order to resist side-to-side movement by trigger 54a, trigger guard 198 is utilized which creates a channel for trigger 54a to move forward and back with very little ability to move to the side without encountering the guard 198.

From the above, it can be seen that the present invention has the advantage of providing a highly efficient smoke generator that can be used for extended periods of time. This generator is readily portable and yet, is highly efficient in producing either large amounts of smoke or bursts of smoke. It is infinitely controllable through the operation of trigger mechanism 54a. This generator is light weight which adds further to its versatility.

The present invention can be readily recharged when used as an independent unit or can just as readily be connected to a back pack supply for extended smoke generation. The back pack supply can also be quickly switched to a fresh supply when desired.

It is clear that the present device can be used with other ingredients added to the smoke for distribution, for example, pepper spray.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. An aerosol device capable of generating smoke comprising:
   a) a base portion for handling the device during use the base portion having a front side;
   b) a heating chamber for vaporizing a smoke producing solution having an inlet back side facing the base portion front side and having an inlet side cap and a smoke outlet side, a heating mantle, a perforated heat shield surrounding the side of the heating chamber, the chamber comprising a fuel ignition chamber, one or more combustion gas exit pipe vents on the inlet back side through the inlet side cap for the release of combustion gas from the heating chamber, and connected to the base portion, the heating chamber mounted in spaced relationship to the base portion on the base portion front side;
   c) a smoke producing solution pressurized by a propellant for the solution, operatively connected to the base and capable of delivering the smoke producing solution to coiled tubing which is tightly wound such that the coils touch positioned within the heating chamber and around the ignition chamber wherein the coil is operatively connected to an exit nozzle which is capable of dispersing the smoke producing solution once it is vaporized in the heating chamber; and
   d) a fuel attached to the base and operably connected to the heating chamber for delivery of the fuel to the ignition chamber for ignition.

2. A device according to claim 1 wherein one or more electric spark generators are positioned within the heating chamber for igniting fuel in the ignition chamber.

3. A device according to claim 2 wherein the one or more electric spark generators are positioned within a gas collection tube, the tube comprising a partially open side portion for collecting gas fuel in the heating chamber and sparking the gas fuel to ignition.

4. A device according to claim 1 wherein the one or more of the fuel gas, the propellant and the smoke producing liquid are in canisters mounted directly to the base.

5. A device according to claim 1 wherein one or more of the fuel gas, the propellant and the smoke producing liquid are in remote canisters from the base.

6. A device according to claim 1 wherein the one or more remote canisters are mounted on a back pack.

7. A device according to claim 1 wherein there is an insulating device positioned between the base and the heating chamber.

8. A device according to claim 1 which further comprises a wireless locating device for locating the position of the aerosol device.

9. A device according to claim 1 wherein there is at least one check value associated with at least one of the fuel gas, the propellant, and the smoke producing liquid.

10. A device according to claim 9 wherein the exit nozzle comprises a check valve.

11. A device according to claim 1 wherein at least one of the propellants, the smoke producing liquid and the gas fuel are fitted with a pressure release valve.

12. A device according to claim 1 wherein at least a portion of the device comprises a nickel-chromium alloy.

13. A device according to claim 1 wherein the exit pipe vent comprises at least one tube positioned in the space between the front side of the base and the inlet back side.

14. A device according to claim 1 wherein the coiled tubing has at least 6 turns to the coil.

15. A device according to claim 1 wherein the exit nozzle has a plurality of exit holes.

16. A device according to claim 1 wherein there is an additive in the smoke producing solution.

17. A device according to claim 16 wherein the additive is selected from the group comprising pepper spray.

18. A device according to claim 1 wherein the heating element is battery operated.

19. A device according to claim 1 wherein the heating chamber is held in spaced relationship to the base on the front of the base by connection to a plurality of mounting rods.

20. A device according to claim 1 wherein the heating mantle is ceramic.

* * * * *